United States Patent [19]

Sato et al.

[11] Patent Number: 4,500,932
[45] Date of Patent: Feb. 19, 1985

[54] SIGNAL PROCESSING CIRCUIT

[75] Inventors: Tetsuo Sato; Yasuo Kominami, both of Takasaki, Japan

[73] Assignee: Hitachi, Ltd., Tokyo, Japan

[21] Appl. No.: 384,602

[22] Filed: Jun. 3, 1982

[30] Foreign Application Priority Data

Jun. 3, 1981 [JP] Japan ................................ 56-84343

[51] Int. Cl.³ .......................... G11B 5/45; G11B 5/02
[52] U.S. Cl. ......................................... 360/65; 360/67
[58] Field of Search ........................ 360/65, 67, 68; 330/284, 295, 304, 307; 333/28 R, 28 T

[56]         References Cited
         U.S. PATENT DOCUMENTS

| | | | |
|---|---|---|---|
| 3,336,540 | 8/1967 | Kwartiroff et al. | 333/28 |
| 3,748,602 | 7/1973 | Delfrate et al. | 333/28 |
| 3,794,935 | 2/1974 | Tsuchiya et al. | 333/28 |
| 3,940,709 | 2/1976 | Heaslett | 330/107 |
| 4,004,253 | 1/1977 | Takasaki et al. | 333/28 |
| 4,110,798 | 8/1978 | Miller et al. | 360/65 |
| 4,371,901 | 2/1983 | Shah | 360/65 |
| 4,389,683 | 6/1983 | Lelandais | 360/67 |
| 4,405,954 | 9/1983 | Guisinger | 360/65 |

FOREIGN PATENT DOCUMENTS 355336 2/1980 Austria ................................ 330/107
2227675 12/1974 Fed. Rep. of Germany ........ 333/28

OTHER PUBLICATIONS

"A Method to Realize a Variable Equalizer", by K. Endo et al., Electronics & Communications in Japan, vol. 52-A, #4, 1929.

Primary Examiner—Vincent P. Canney
Attorney, Agent, or Firm—Antonelli, Terry & Wands

[57] ABSTRACT

A signal processing circuit which can be used, for example, as a playback equalizer is formed in a semiconductor integrated circuit with a main path and a side path arrayed between the input terminal and the output terminal of the integrated circuit. The signals at the ends of the main and side paths are added together to obtain the output signal for the signal processor. A filter in the main path determines its frequency characteristics. On the other hand, a variable gain control means having substantially flat frequency characteristics is inserted in the side path and its gain can be changed in response to control data to control the output signal of the signal processor.

10 Claims, 8 Drawing Figures

SIGNAL PROCESSING CIRCUIT

BACKGROUND OF THE INVENTION

The present invention relates to a signal processing circuit such as playback equalizer used in reproducing signals recorded on a magnetic tape.

Referring to FIG. 1, the overall recording/playback frequency characteristic $l_{12}$ deviates from the ideal characteristic $l_{11}$ due to losses during recording (such as eddy-current loss in the recording head, losses from demagnetization, tape thickness loss, etc.) and losses during playback (loss due to the clearance between the tape and the head, eddy-current loss in the reproducing head, gap loss in the reproducing head, etc.). The overall frequency characteristic $l_{12}$ has a peak response at a frequency of about 5 KHz.

In order to flatten the frequency characteristic of a circuit having peaky response, a considerable degree of frequency compensation is necessary in the recording and playback circuits. The operation of compensating frequencies is called equalization, and a circuit for this operation is called an equalizer.

Taking the signal-to-noise ratio and distortion into consideration, the high-frequency region is compensated during recording, and the low-frequency region is compensated during playback. The amount of compensation is varied depending upon the speed of the tape, the kind of tape, the construction and performance of the head, etc. With an object of obtaining compatibility among a variety of magnetic recording/reproducing apparatuses, normal playback compensation characteristics have been determined for each tape seed. FIG. 2 shows examples of recording and playback compensation characteristics for tape speeds of 19 cm/sec and 9.5 cm/sec.

On one hand, the normal playback compensation characteristics are determined by two time constants $T_1$ and $T_2$ of a circuit which is made up of a combination of a group of capacitors and a group of resistors. Table 1 illustrates principal standard normal playback compensation characteristics.

TABLE 1

Normal playback compensation characteristics

| | Tape speed | | | | | | | |
|---|---|---|---|---|---|---|---|---|
| | 38 | | 19 | | 9.5 | | 4.8 | |
| | Time constant | | | | | | | |
| | $T_1$ | $T_2$ | $T_1$ | $T_2$ | $T_1$ | $T_2$ | $T_1$ | $T_2$ |
| BTS | 3180 | 35 | 3180 | 50 | — | — | — | — |
| CCIR | — | 35 | — | 70 | — | — | — | — |
| DIN | — | 35 | — | 70 | — | — | — | — |
| | — | — | 3180 | 50 | 3180 | 90 | 3180 | 120 |
| IEC | — | 35 | — | 70 | 3180 | 90 | 1590 | 120 |
| JIS | — | — | 3180 | 50 | 3180 | 90 | — | — |
| NAB | 3180 | 50 | 3180 | 50 | 3180 | 90 | 3180 | 90 |
| RIAA | — | — | 3180 | 50 | 3180 | 90 | 1590 | 120 |

Tape speed [cm/sec], time constant [microseconds]

On the other hand, in the field of magnetic tape recording/playback apparatuses, not only the open reel-type and cassette-type apparatus having different tape speeds have been developed, but also normal tapes, chrome tapes and metal tapes having different characteristics have been developed.

Even in the cassette type magnetic tape recording/playback apparatus in which the standard tape speed is 4.8 cm/sec, the tape is sometimes run at half speed or double speed. Therefore, playback compensation characteristics are required for the magnetic tape playback equalizer to respond to both various tape speeds and various kinds of magnetic tape.

FIG. 3 shows playback compensation characteristics suited for this sort of magnetic tape playback equalizer, in which the gain of playback compensation characteristics is about 40 dB at a frequency $f_1$ of 50 Hz which corresponds to a time constant $T_1$ of 3180 microseconds, and the gain decreases by 20 dB per octave in the frequency bands higher than $f_1$. When any one of the frequencies $f_{21}$, $f_{22}$, $f_{23}$, $f_{24}$, $f_{25}$ and $f_{26}$ corresponding to the respective time constants $T_2$ of 35 $\mu S$, 50 $\mu S$, 70 $\mu S$, 120 $\mu S$ and 200 $\mu S$, is selected, the gain assumes flat characteristics in the frequency band higher than the selected frequency. Thus, equalization can be provided for different tape seeds and tape types by appropriate selection of the time constants to control the playback compensation characteristics.

In the conventional magnetic tape playback equalizer, a negative feedback circuit is constructed based upon a negative feedback-type amplifier circuit which is made up of a combination of a group of capacitors and a group of resistors. To change the playback compensation characteristics in response to the tape speed and the kind of tape, the resistances of the resistor group in the negative feedback circuit must be changed. Therefore, it was not possible to form the negative feedback circuit for such a conventional playback equalizer in a monolithic semiconductor integrated circuit.

Prior to filing the present application, the inventors of the present invention considered a system in which the time constant $T_2$ at a high frequency $f_2$ in the playback compensation characteristics is specified by means of a group of semiconductor diffused resistors and a group of semiconductor switching elements formed in a monolithic semiconductor integrated circuit and by a capacitor array outside the monolithic semiconductor integrated circuit. As is well known among those skilled in the art, however, the resistance of diffused resistors formed in a monolithic semiconductor integrated circuit have errors of ±20% that stem from the process for manufacturing the integrated circuits. This fact causes the time constant $T_2$ at a high frequency $f_2$ in the playback compensation characteristics to vary greatly, so a system of this type is not practical for providing accurate playback compensation.

SUMMARY OF THE INVENTION

Accordingly, it is an object of the present invention to provide a signal processing circuit such as an equalizer which can be formed in a monolithic semiconductor integrated circuit.

It is a further object of the present invention to provide an equalizer formed in a monolithic semiconductor integrated circuit which has frequency characteristics which are substantially unaffected by dispersion in the integrated circuit manufacturing process.

To achieve these and other objects of the present invention in accordance with a fundamental embodiment of the present invention, a filter for determining frequency characteristics is inserted in a main path of the signal processing circuit, and variable gain control means having substantially flat frequency characteristics is inserted in a side path of the signal processing circuit.

BRIEF DESCRIPTION OF THE DRAWINGS

The invention will now be described in conjunction with the drawings, wherein.

DESCRIPTION OF THE PREFERRED EMBODIMENTS

Embodiment I

Figure 4:
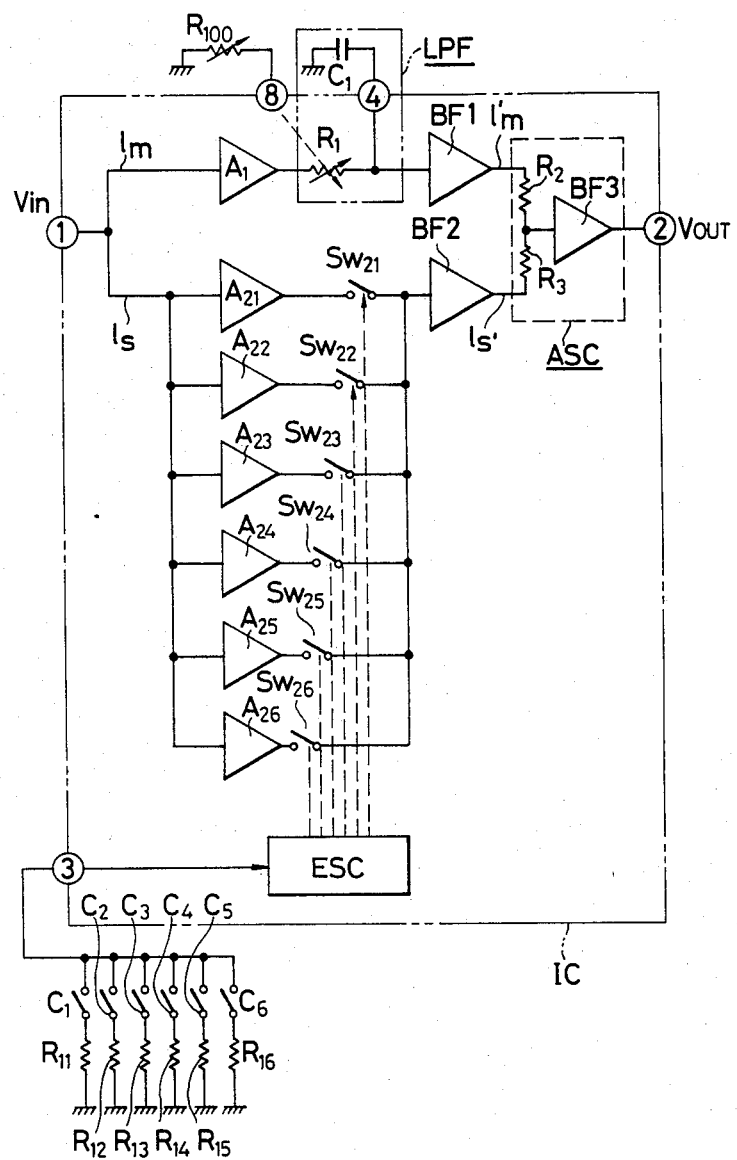
FIG. 4 is a circuit diagram of a playback equalizer according to a first embodiment of the present invention.

FIG. 4 is a circuit diagram showing a playback equalizer according to an embodiment of the present invention, in which parts surrounded by a broken line IC are formed in a monolithic semiconductor integrated circuit. Circled numerals indicate terminal numbers of the integrated circuit.

A playback signal $V_{in}$ from a recording/playback head (not shown) is transmitted to a first terminal of the integrated circuit IC, and then to a main path $l_m$—$l'_m$ and a side path $l_s$—$l'_s$ of a playback equalizer. The first terminal is connected to the input terminal of a first amplifier $A_1$ which has substantially flat frequency characteristics, an output terminal of $A_1$ is connected to the input terminal of a first buffer circuit BF1 (which can be, for example, an emitter-follower circuit) having a high input impedance via a low-pass filter LPF which determines the frequency characteristics.

The low-pass filter LPF consists of an electronic impedance device $R_1$ formed in an integrated circuit and a first capacitor $C_1$ disposed outside the integrated circuit. The resistance of the electronic impedance device $R_1$ can be freely changed by changing the resistance of an external resistor $R_{100}$ connected to an eighth terminal. The voltage or current at the eighth terminal can be changed, whereby the resistance of the electronic impedance device $R_1$ can be accurately adjusted relying upon the change in the quantity of electricity.

Figure 1:
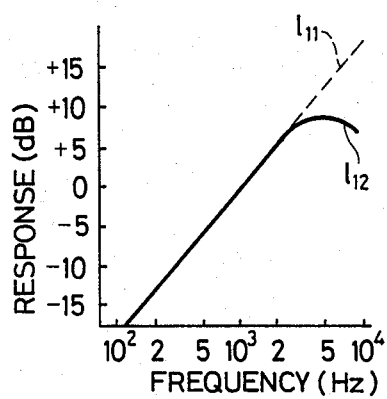
FIG. 1 is a diagram showing an overall recording/playback frequency characteristic of a magnetic tape.
Figure 2:
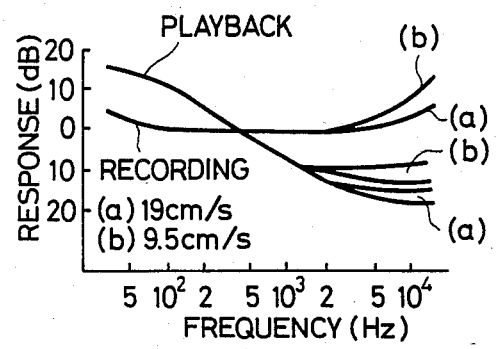
FIG. 2 is a diagram showing an example of recording and playback compensation characteristics.
Figure 3:
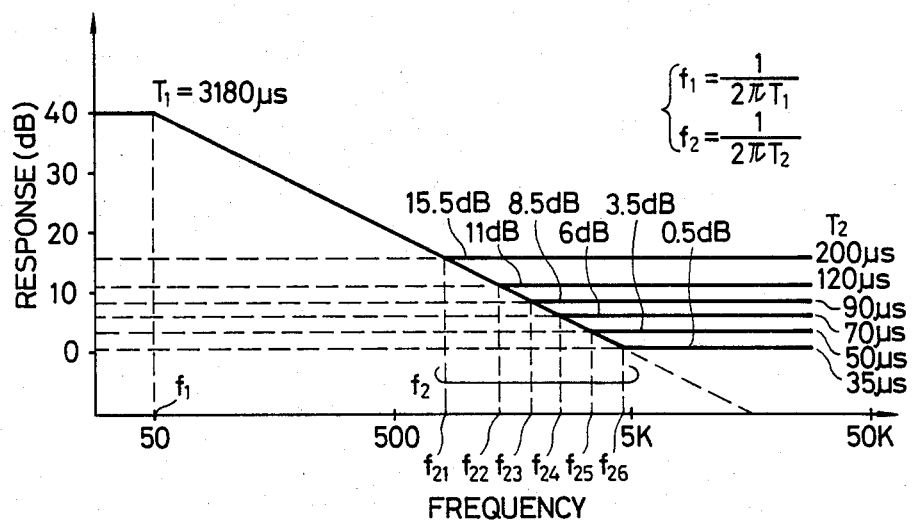
FIG. 3 is a diagram showing playback compensation characteristics adapted for a magnetic tape playback equalizer.

A time constant $T_1$ of 3180 microseconds (i.e., frequency $f_1$ of 50 Hz) in the playback compensation characteristics of FIG. 3 can be established by setting the capacitance of the first capacitor $C_1$ to be, for example, 0.047 μF, and setting the resistance of the electronic impedance device $R_1$ to be 67.659 kiloohms.

A voltage gain of about 40 dB can be maintained in the amount of the signal transmitted through the low-pass filter LPF, i.e., flat characteristics can be maintained in a frequency band lower than the frequency $f_1$ of 50 Hz. The gain decreases by 20 dB per octave in the frequency bands higher than the frequency $f_1$.

A signal transmitted from the low-pass filter LPF is produced at the output terminal of the first buffer circuit BF1 at the end $l'_m$ of the main path with low output impedance. This signal is then fed to an analog adder ASC.

Input terminals of a plurality of amplifiers $A_{21}$, $A_{22}$, $A_{23}$, $A_{24}$, $A_{25}$ and $A_{26}$ having substantially flat frequency characteristics are connected to the first terminal. Their output terminals are connected to an input terminal of a second buffer circuit BF2 (which can be, for example, an emitter-follower circuit) having a high input impedance via electronic switching devices $SW_{21}$, $SW_{22}$, $SW_{23}$, $SW_{24}$, $SW_{25}$ and $SW_{26}$. By way of example, the amplifiers $A_{21}$, $A_{22}$, $A_{23}$, $A_{24}$, $A_{25}$ and $A_{26}$ can have voltage gains of about 15.5 dB, 11 dB, 3.5 dB, 0 dB, 3.5 dB and 0.5 dB, respectively.

The control input terminal of an electronic switch control circuit ESC is connected to a third terminal which is connected to a group of electric contacts $C_1$, $C_2$, $C_3$, $C_4$, $C_5$ and $C_6$ outside the integrated circuit and to a group of external resistors $R_{11}$, $R_{12}$, $R_{13}$, $R_{14}$, $R_{15}$ and $R_{16}$. The external resistors $R_{11}$ to $R_{16}$ have different resistances.

The electronic switch control circuit ESC serves as a coupling circuit for operating a selected one of the switches $SW_{21}$ to $SW_{26}$ in response to the closing of a selected one of the external contacts $C_1$ to $C_n$. For example, when the electric contact $C_1$ is closed, only the electronic switching device $SW_{21}$ is closed by the electronic switch control circuit ESC. Therefore, the input signal fed to the amplifier $A_{21}$ at the starting end $l_s$ of the side path is amplified in accordance with the voltage gain (15.5 dB) of the amplifier $A_{21}$, and is then transmitted to the input terminal of the second buffer circuit BF2 (such as an emitter-follower circuit), which has high impedance. Similarly, when the electric contact $C_2$ is closed, only the electric switching device $SW_{22}$ is closed, and the input signal at the starting end $l_s$ of the side path is amplified in accordance with the voltage gain (11 dB) specific to the amplifier $A_{22}$. In the same manner, when any one of the electric contacts $C_3$ to $C_n$ is closed, the corresponding electronic switching device is closed among the electronic switching devices $SW_{23}$ to $SW_{26}$, and the input signal at the starting end $l_s$ of the side path is amplified in accordance with the voltage gain specific to the corresponding amplifier among the amplifiers $A_{23}$ to $A_{26}$. The actual construction of the ESC can be done in accordance with known principles for logic circuit design using conventional logic elements.

The output signal of any one of the amplifiers $A_{21}$ to $A_{26}$ is produced at the output terminal of the second buffer circuit BF2 at the end $l'_s$ of the side path with low output impedance, and is fed to the analog adder ASC.

The analog adder ASC consists of semiconductor diffused transistors $R_2$ and $R_3$ which preferably have an equal resistance of, for example, 12 kiloohms, and a third buffer circuit BF3. The third buffer circuit BF3 consists, for example, of an emitter-follower circuit which has a high input impedance and a low output impedance.

The analog adder circuit ASC performs analog addition of the signal voltage at the end $l'_m$ of the main path and the signal voltage at the end $l'_s$ of the side path, and sends the added signal to the second terminal of the integrated circuit IC.

Figure 7:
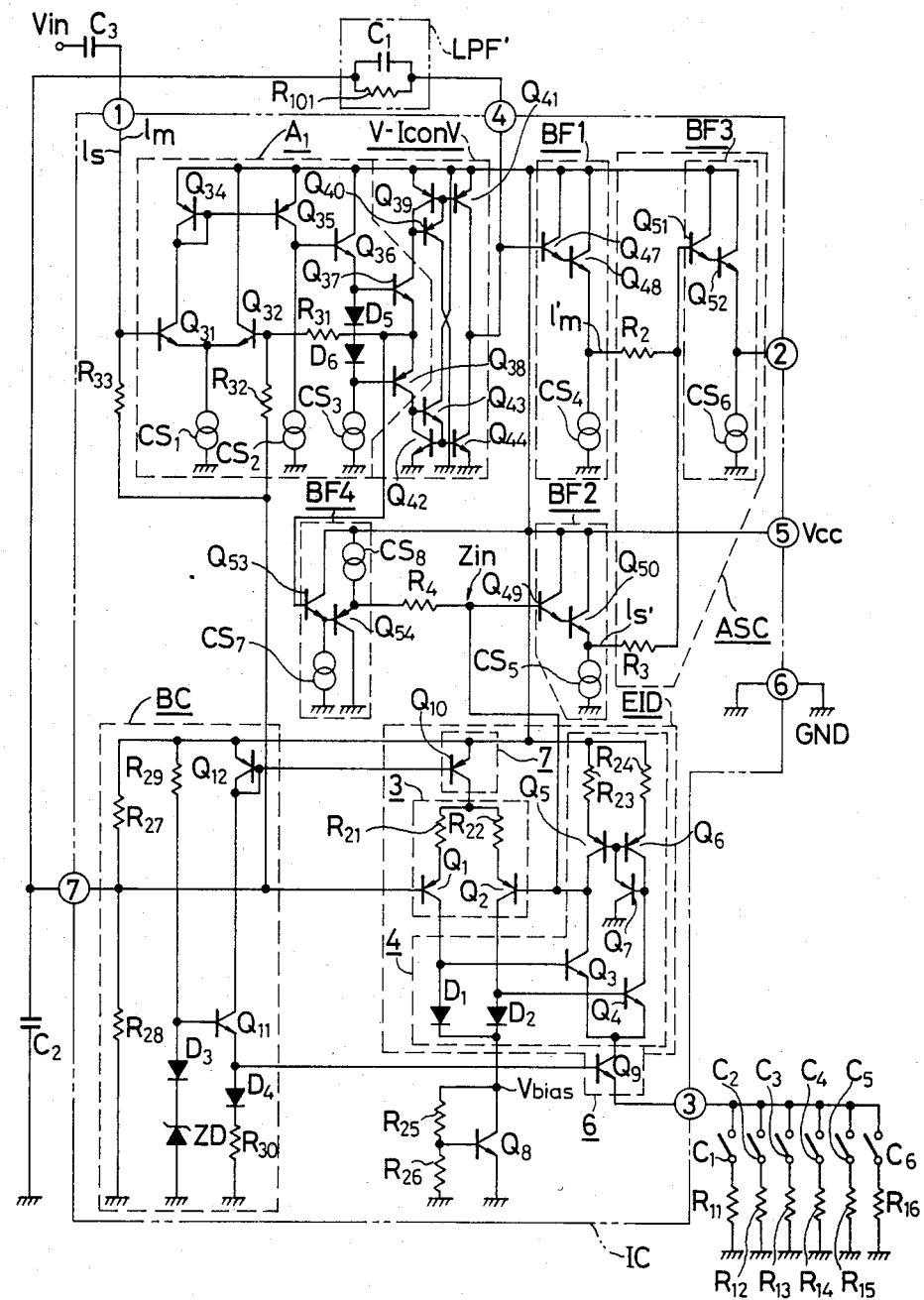
Figure 8:
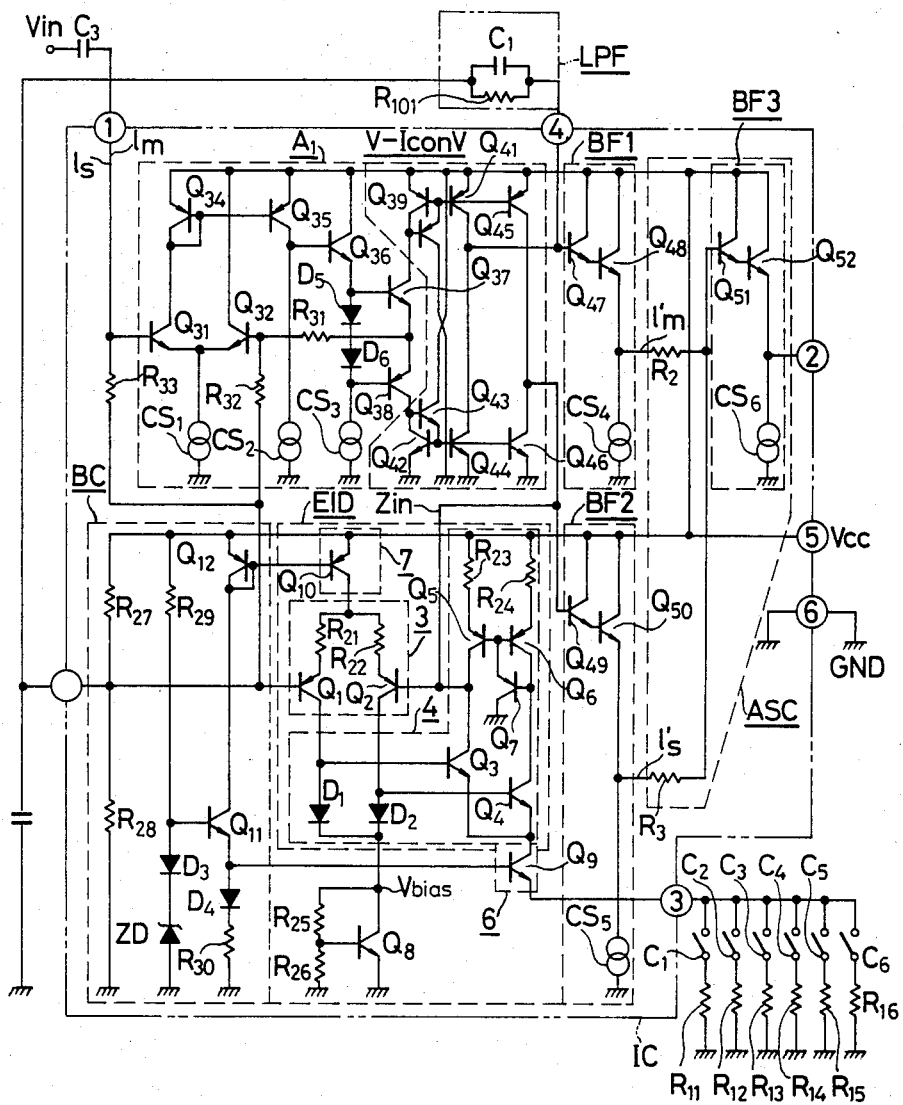
FIG. 8 is a circuit diagram of a playback equalizer according to still another embodiment of the present invention.

Here, it should be noted that each of the amplifiers $A_1$, $A_{21}$, $A_{22}$, $A_{23}$, $A_{24}$, $A_{25}$ and $A_{26}$ includes a plurality of internal resistors, and that the resistance ratios of these semiconductor resistors in the monolithic semiconductor integrated circuits determine the voltage gains of each of the amplifiers. An example of the amplifier $A_1$ is shown in FIGS. 7 and 8, and the other amplifiers can be constructed in a similar manner. These resistances can be either diffused or formed by ion implantation in the semiconductor integrated circuit, and in either case the resistance ratios have very small errors. Therefore, it can be seen that a significant advantage of the present invention is the fact that the voltage gains of the amplifiers $A_1$ and $A_{21}$ to $A_{26}$ are based upon the resistance ratios of semiconductor resistors which deviate little in the integrated circuit manufacturing process.

The object of the invention can be accomplished by the above-mentioned embodiment I, for the following reasons:

(1) The playback compensation characteristics at frequencies lower than the frequency $f_1$ of 50 Hz are substantially determined by the voltage gain of the amplifier $A_1$.

(2) The frequency $f_1$ of 50 Hz is accurately set by the capacitance of the first capacitor $C_1$ and the resistance of the adjustable electronic impedance device $R_1$.

(3) At frequencies higher than the frequency $f_1$ of 50 Hz, the frequency characteristics of $-20$ dB/octave are exclusively determined by the RC type low-pass filter LPF.

(4) Since the voltage gains of the amplifiers $A_{21}$ to $A_{26}$ are accurately determined by the resistance ratios of semiconductor resistors in the monolithic semiconductor integrated circuit, and on account of the above-mentioned reasons (1) to (3), it is possible to accurately adjust the frequencies $f_{21}$ (796.1 Hz), $f_{22}$ (1.3269 KHz), $f_{23}$ (1.7692 KHz), $f_{24}$ (2.2747 KHz), $f_{25}$ (3.1847 KHz) and $f_{26}$ (4.5495 KHz) that correspond to respective time constants $T_2$ of 200 $\mu$S, 120 $\mu$S, 90 $\mu$S, 70 $\mu$S, 50 $\mu$S and 35 $\mu$S, as shown in FIG. 3.

Embodiment II

Figure 5:
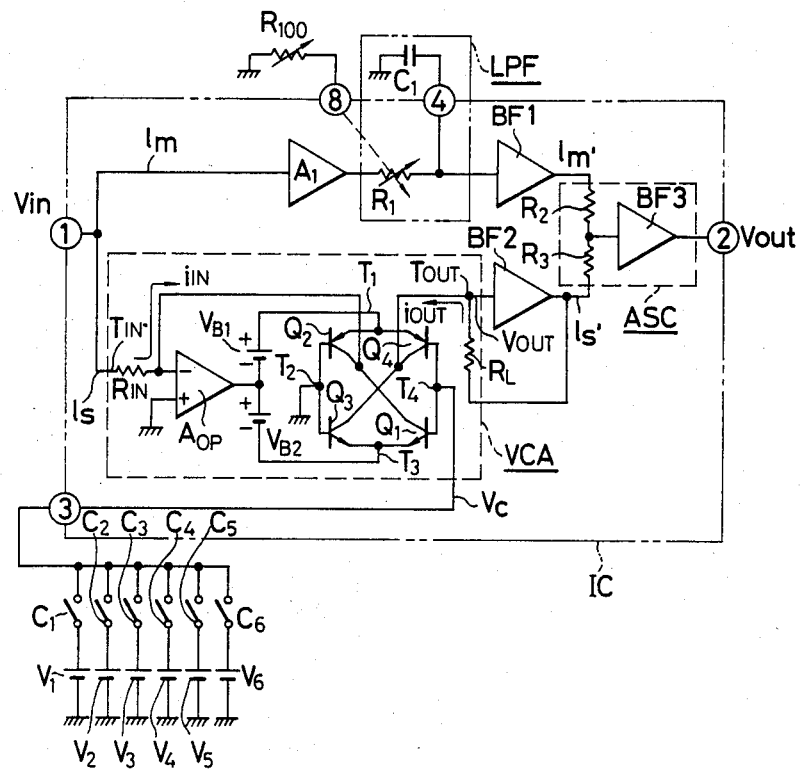
FIG. 5 is a circuit diagram of a playback equalizer according to another embodiment of the present invention.

FIG. 5 is a circuit diagram of a playback equalizer according to another embodiment of the present invention, in which the same portions as those of the embodiment of FIG. 4 are denoted by the same reference symbols or numerals. Description of such identical elements is omitted here.

In FIG. 5, the amplifiers $A_{21}$, $A_{22}$, $A_{23}$, $A_{24}$, $A_{25}$ and $A_{26}$ employed in the embodiment of FIG. 4 are replaced by a voltage controlled variable gain circuit VCA, and the group of external resistors $R_{11}$, $R_{12}$, $R_{13}$, $R_{14}$, $R_{15}$ and $R_{16}$ employed in the embodiment of FIG. 4 is replaced by control voltages $V_1$, $V_2$, $V_3$, $V_4$, $V_5$ and $V_6$ having different voltage levels. Further, the embodiment of FIG. 5 does not employ the electronic switch control circuit ESC that was used in the embodiment of FIG. 4.

The voltage controlled variable gain circuit VCA consists of an input resistor $R_{IN}$, an operational amplifier $A_{OP}$, level-shifting batteries $V_{B1}$ and $V_{B2}$, NPN-type transistors $Q_1$ and $Q_3$, PNP-type transistors $Q_2$ and $Q_4$, and a load resistor $R_L$. The inverting input terminal $(-)$ of the operational amplifier $A_{OP}$ is connected to collectors of the transistors $Q_1$ and $Q_2$, and is further connected to an input terminal $T_{IN}$ (starting end $l_s$ of the side path) via the input resistor $R_{IN}$. The non-inverting input terminal $(+)$ of $A_{OP}$ is grounded. The output level of the operational amplifier $A_{OP}$ is shifted by the batteries $V_{B1}$ and $V_{B2}$, and the thus shifted two voltages are applied to the emitters (connection point $T_1$) of the PNP-type transistors $Q_2$, $Q_4$, and the emitters (connection point $T_3$) of the NPN-type transistors $Q_1$, $Q_3$, respectively.

The bases (connection point $T_2$) of the PNP-type transistor $Q_2$ and the NPN-type transistor $Q_3$ are connected to a point of ground potential. When a control voltage $V_C$ for controlling the gain is applied to the bases (connection point $T_4$) of the PNP-type transistor $Q_4$ and the NPN-type transistor $Q_1$, a variable output voltage $V_{OUT}$ is produced across the load resistor $R_L$, as given by, $$i_{IN} = \frac{V_{in}}{R_{IN}} \quad (1)$$

$$\frac{i_{OUT}}{i_{IN}} = \exp\frac{q(-V_c)}{KT} \quad (2)$$

$$V_{OUT} = R_L \cdot i_{OUT} \quad (3)$$

where
q denotes the electric charge of an electron;
K denotes Boltzmann's constant;
T denotes absolute temperature; and
$V_c$ denotes the control voltage.

By suitably setting the voltage levels of the control voltages $V_1$ to $V_6$, the voltage gain of the voltage controlled variable gain circuit VCA can be set to suitable values. Accordingly, it is possible to accurately set time constants $T_2$ of 200 $\mu$S, 120 $\mu$S, 90 $\mu$S, 70 $\mu$S, 50 $\mu$S and 35 $\mu$S in the playback compensation characteristics of FIG. 3.

The voltage controlled variable gain circuit VCA is already widely known. For details, reference should be made to British Patent Laid-Open Specification No. 2,053,598 and German Patent Laid-Open Specification No. 3,021,788 which were filed based upon Japanese Patent Application No. 72290/79 entitled "Signal Transmission Circuit" filed on June 11, 1979.

Embodiment III

Figure 6:
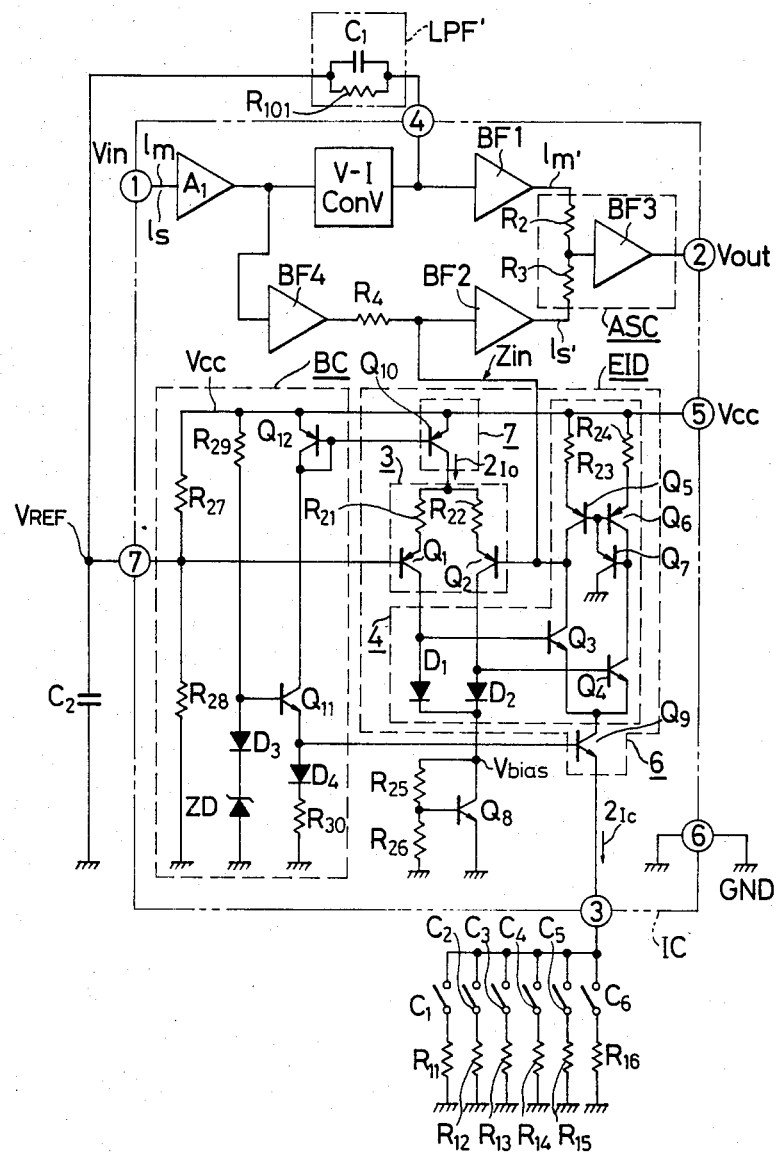
FIGS. 6 and 7 are circuit diagrams of a playback equalizer according to a further embodiment of the present invention.

FIG. 6 is a circuit diagram of a playback equalizer according to a further embodiment of the present invention, in which the same portions as those of the above-mentioned embodiment are denoted by the same reference symbols or numerals. Description of such identical elements is omitted.

In the embodiment of FIG. 6, the low-pass filter LPF consisting of electronic impedance device $R_1$ and a first capacitor $C_1$ employed in the embodiments of FIGS. 4 and 5 is replaced by a voltage-current converter V-Iconv and a low-pass filter LPF' which consists of an external resistor $R_{101}$ and a first capacitor $C_1$. Further, the eighth terminal and the external resistor $R_{100}$ are omitted.

In the low-pass filter LPF', if the capacitance of the first capacitor $C_1$ is set to, for example, 0.047 $\mu$F and the resistance of the external resistor $R_{101}$ is set to 67.659 kiloohms, a time constant $T_1$ of 3180 $\mu$S (at the frequency $f_1$ of 50 Hz) can be obtained in the playback compensation characteristics of FIG. 3.

A voltage gain with flat frequency characteristics at frequencies lower than the frequency $f_1$ of 50 Hz can be set on the main path $l_m$ by the voltage gain of the first amplifier $A_1$, by the converting rate of the voltage-current converter V-Iconv, and by the resistance of the external resistor $R_{101}$ in the low-pass filter LPF'.

A fourth buffer circuit BF4 (such as an emitter-follower circuit) and a semiconductor diffused resistor $R_4$ are inserted in the side path $l_s$. An electronic impedance device EID is connected to the point where the semiconductor diffused resistor $R_4$ is connected to the input terminal of the second buffer circuit BF2.

The electronic impedance device EID consists of a voltage-current converter 3 having a high input impedance, a variable gain current amplifier 4, a variable constant current source 6, and a constant current source 7. The voltage-current converter 3 having a high input impedance consists of PNP-type transistors $Q_1$, $Q_2$, and semiconductor diffused resistors $R_{21}$, $R_{22}$. The variable gain current amplifier 4 consists of diodes $D_1$, $D_2$, NPN-type transistors $Q_3$, $Q_4$, PNP-type transistors $Q_5$, $Q_6$, $Q_7$, and semiconductor diffused resistors $R_{23}$, $R_{24}$. The variable constant current source 6 consists of an NPN-type transistor $Q_9$, and the constant current source 7 consists of a PNP-type transistor $Q_{10}$. For details of the electronic impedance device EID, reference should be made to Japanese Patent Laid-Open No. 11602/77 entitled "Electronic Impedance Device" and U.S. Pat. No. 4,220,875.

Cathodes of the diodes $D_1$, $D_2$ are served with a bias voltage Vbias determined by the semiconductor diffused resistors $R_{25}$, $R_{26}$ and by the base-emitter forward voltage of the transistor $Q_8$.

The input impedance Zin of the electronic impedance device EID at the point where the base of the transistor $Q_2$ is connected to collectors of the transistors $Q_3$, $Q_5$ can be changed by varying the value of the constant current which flows into the collector-emitter path of transistor $Q_9$ which serves as the variable constant current source 6.

A bias circuit BC consists of semiconductor diffused resistors $R_{27}$, $R_{28}$, $R_{29}$, $R_{30}$, transistors $Q_{11}$, $Q_{12}$, diodes $D_3$, $D_4$, and a Zener diode ZD, and produces various bias voltages. The point where resistors $R_{27}$ and $R_{28}$ are connected together is connected to an external capacitance $C_2$ via a seventh terminal of the integrated circuit IC and to an AC ground. Further, a reference voltage $V_{REF}$ generated at this connection point is fed to the low-pass filter LPF' and to the electronic impedance device EID.

A constant voltage supplied from the emitter of transistor $Q_{11}$ in the bias circuit BC is applied to the base of the transistor $Q_9$ which operates as the variable constant current source 6. The emitter of transistor $Q_9$ is, in turn, connected via a third terminal of the integrated circuit IC to a group of electric contacts $C_1$, $C_2$, $C_3$, $C_4$, $C_5$ and $C_6$, and a group of external resistors $R_{11}$, $R_{12}$, $R_{13}$, $R_{14}$, $R_{15}$ and $R_{16}$.

When any one of electric contacts $C_1$ to $C_6$, is closed, the corresponding resistor among the external resistors $R_{11}$ to $R_{16}$ is connected to the emitter of the transistor $Q_9$ which serves as the variable constant current source 6, thereby changing the value of the constant current flowing into the collector-emitter path of transistor $Q_9$. Thus, the gain on the side path $l_s$ is determined by the resistance of the semiconductor diffused resistor $R_4$ and by the input impedance Zin of the electronic impedance device EID, and so it is possible to set time constants $T_2$ of 200 μS, 120 μS, 90 μS, 70 μS, 50 μS and 35 μS in the playback compensation characteristics of FIG. 3.

Looking in detail at the input impedance Zin, when the resistors $R_{21}$ and $R_{22}$ have an equal resistance, the input impedance Zin of the electronic impedance device EID is given by the following equations:

$$Z_{in} = \frac{r_{e2} + R_{22}}{r_{e2}} \cdot R_{e2}$$

$$r_{e2} = r_{d2} = \frac{KT}{qIo}$$

$$r_{e4} = \frac{KT}{qIc}$$

where $r_{e2}$ denotes the dynamic resistance at the base-emitter junction of transistor $Q_2$;

$r_{d2}$ denotes the dynamic resistance of diode $D_2$;

$r_{e4}$ denotes the dynamic resistance at the base-emitter junction of transistor $Q_4$;

K denotes Boltzmann's constant;

T denotes absolute temperature;

q denotes the electric charge of an electron;

Io denotes a value of one-half the constant current flowing into the collector-emitter path of the transistor $Q_{10}$; and Ic denotes a value one-half of the constant current flowing into the collector-emitter path of transistor $Q_9$.

The following equation can be derived from the above equations (4), (5) and (6).

$$Z_{in} = \frac{\frac{KT}{qIo} + R_{22}}{\frac{KT}{qIo}} \cdot \frac{KT}{qIc}$$

If the constant current Io is set at 250 μA, the dynamic resistances $r_{e2}$, $r_{d2}$ ($= KT/qIo$) become about 100 ohms, since KT/q is 26 mV. If the resistance of the semiconductor diffused resistor $R_{22}$ is set to, for example, 3 kiloohms, the dynamic resistance $r_{e2}$ becomes negligibly small compared with the diffused resistor $R_{22}$. Therefore, the above equation (7) can approximately be written as follows:

$$Z_{in} \approx R_{22} \cdot \frac{Io}{Ic}$$

The potential differences between both ends of the diode $D_3$ and the diode $D_4$, and the potential differences between the bases and the emitters of transistors $Q_9$ and $Q_{11}$ become substantially equal to the forward voltage $V_F$ at the PN junction. Therefore, the constant current 2Io which flows into the collector-emitter path of transistor $Q_{10}$ serving as the constant-current source 7 is given by the following equation (9), and the constant current 2Ic which flows into the collector-emitter path of transistor $Q_9$ serving as the variable constant-current source 6, when the electric contact $C_1$ is closed, is given by the equation (10).

$$2Io = \frac{V_Z - V_F}{R_{10}}$$

$$2Ic = \frac{V_Z - V_F}{R_{11}}$$

where $V_Z$ denotes the Zener voltage of the Zener diode $ZD_1$.

By inserting equations (9) and (10) into equation (8), the following equation can be obtained:

$$Z_{in} = \frac{R_{22}}{R_{30}} \cdot R_{11}* \quad (11)$$

As will be obvious from the equation (11), the semiconductor diffused resistors $R_{22}$ and $R_{30}$ have equal temperature dependency and equal deviation since they are produced by the same manufacturing process. Moreover, the resistance $R_{11}*$ of the external resistor $R_{11}$ can be accurately given any value, with very little temperature dependency. Accordingly, the temperature dependency and error in the input impedance $Z_{in}$ can be reduced to very small values.

FIG. 7 shows the circuit of FIG. 6 in detail. In FIG. 7, the same portions as those of the above-mentioned embodiments are denoted by the same reference symbols or reference numerals, and their details are omitted.

The first amplifier $A_1$ consists of NPN-type transistors $Q_{31}$ and $Q_{32}$ which are differentially connected, PNP-type transistors $Q_{34}$ and $Q_{35}$ which form a current mirror, an emitter-follower NPN-type transistor $Q_{36}$, an NPN-type transistor $Q_{37}$ and a PNP-type transistor $Q_{38}$ which constitute a push-pull amplifier circuit, bias diodes $D_5$ and $D_6$, constant current sources $CS_1$, $CS_2$, and $CS_3$, and semiconductor diffused resistors $R_{31}$ and $R_{32}$ which form a negative feedback circuit. The voltage gain of the first amplifier $A_1$ is determined by the ratio of the resistances of semiconductor diffused resistors $R_{31}$ and $R_{32}$. Therefore, error in the voltage gain can be made very small.

The voltage-current converter V-Iconv includes PNP-type transistors $Q_{39}$, $Q_{40}$ and $Q_{41}$ which form a first current mirror, and NPN-type transistors $Q_{42}$, $Q_{43}$ and $Q_{44}$ which form a second current mirror. The electric current which flows into the first current mirror is determined by the current which flows into the collector of NPN-type transistor $Q_{37}$, and the current which flows into the second current mirror is determined by the current which flows into the collector of PNP-type transistor $Q_{38}$.

The first, second, third and fourth buffer circuits BF1, BF2, BF3 and BF4 are made up of transistors $Q_{47}$, $Q_{48}$, $Q_{49}$, $Q_{50}$, $Q_{51}$, $Q_{52}$, $Q_{53}$, $Q_{54}$, and constant current sources $CS_4$, $CS_5$, $CS_6$, $CS_7$ and $CS_8$.

Embodiment IV

FIG. 8 is a circuit diagram of a playback equalizer according to still another embodiment of the present invention, in which the same portions as those of the above-mentioned embodiments are denoted by the same reference symbols or numerals, and their details are not described here.

The embodiment of FIG. 8 does not possess the fourth buffer circuit BF4 and the semiconductor diffused resistor $R_4$ that were employed in the embodiments of FIGS. 6 and 7. Instead, the first current mirror of the voltage current converter V-Iconv further includes a PNP-type transistor $Q_{45}$, and the second current mirror includes an NPN-type transistor $Q_{46}$, the collectors of the two transistors $Q_{45}$ and $Q_{46}$ being connected to the electronic impedance device EID.

When a playback signal voltage Vin is applied to the first terminal, the amplified signal voltage $V_{37-38}$ produced across the emitters of transistor $Q_{37}$ and transistor $Q_{38}$ of the first amplifier $A_1$ is given by the following equation:

$$V_{37-38} = \frac{R_{31} + R_{32}}{R_{32}} \cdot V_{in} \quad (12)$$

The signal current $I_{41-44}$ obtained from the collectors of transistors $Q_{41}$, $Q_{42}$ in the voltage-current converter V-Iconv, and a signal current $I_{45-46}$ obtained from the collectors of transistors $Q_{45}$, $Q_{46}$, are given by the following equation:

$$I_{41-44} = I_{45-46} = \frac{V_{37-38}}{R_{31} + R_{32}} = \frac{V_{in}}{R_{32}} \quad (13)$$

The signal voltage $V_{LPF'}$ produced in the low-pass filter LPF' at frequencies lower than the frequency $f_1$ of 50 Hz, is given by the equation:

$$V_{LPF'} = R_{101}* \cdot I_{41-44} = \frac{R_{101}*}{R_{32}} \cdot V_{in} \quad (14)$$

Further, the signal voltage $V_{EID}$ produced in the electronic impedance device EID is given by the equation:

$$V_{EID} = Z_{in} \cdot I_{45-46} = \frac{R_{22} \cdot R_{11}*}{R_{30} \cdot R_{32}} \cdot V_{in} \quad (15)$$

As will be obvious from the above equations (14) and (15), the semiconductor diffused resistors $R_{22}$, $R_{30}$ and $R_{32}$ have equal temperature dependency and equal deviation, since they are produced by the same manufacturing process. Further, resistances $R_{101}*$ and $R_{11}*$ of the external resistors $R_{101}$ and $R_{11}$ are given accurate values with very little temperature dependency. Thus, the temperature dependency of the two signal voltages $V_{LPF'}$ and $V_{EID}$ resembles the deviation caused by the manufacturing process.

In this embodiment IV, the object of the invention is accomplished for the following reasons:

(1) A signal voltage $V_{LPF'}$ produced in the low-pass filter LPF' and a signal voltage $V_{EID}$ produced in the electronic impedance device EID are determined by the ratio of an external resistance to the semiconductor diffused resistance. Therefore, playback compensation characteristics at frequencies lower than the frequency $f_1$ of 50 Hz and playback compensation characteristics at frequencies higher than the frequency $f_2$ which corresponds to a time constant $T_2$ have a tendency that resembles the tendency of deviation dependent upon the manufacturing process.

(2) The frequency $f_1$ of 50 Hz is precisely set by the capacitance of the first capacitor $C_1$ and the resistance of external resistor $R_{101}$.

(3) At frequencies higher than the frequency $f_1$ of 50 Hz, frequency characteristics of −20 dB/octave are exclusively defined by the RC-type low-pass filter LPF'.

Although details of various elements such as the amplifiers and buffers have been given in the foregoing description, it is to be understood that other suitable semiconductor elements could be used to achieve the described functions.

It is to be understood that the above-identified arrangements are simply illustrative of the application of the principles of this invention. Numerous other arrangements may be readily devised by those skilled in the art which embody the principles of the invention and fall within its spirit and scope.

We claim:

1. A playback equalizer for providing compensation for a playback signal from a magnetic tape playback head comprising:
   (a) a main path having a first end and a second end, said first end being supplied with said playback signal;
   (b) a side path having a first end and a second end, said first end being supplied with said playback signal;
   (c) a low-pass filter disposed between said first end and said second end of said main path, said low-pass filter transmitting a signal which has a first component of flat frequency characteristic below a predetermined first frequency as well as a second component of decreasing frequency characteristic above said predetermined first frequency to said second end;
   (d) variable gain means disposed between said first end and said second end of said side path, said variable gain means having a substantially flat frequency characteristic over a predetermined frequency range and the gain which is varied in response to control data; and
   (e) an adder coupled to said second ends of said main and side paths, said adder including mans for adding a signal at said second end of said main path and a signal at said second end of said side path and means for transmitting the added signal which has a first component of flat frequency characteristic below said predetermined first frequency, a second component of decreasing frequency characteristic between said predetermined first frequency and a predetermined second frequency and a third component of flat frequency characteristic above said predetermined second frequency to the output terminal, said predetermined second frequency being adjusted by said decreasing frequency characteristic of said low-pass filter and said gain of said variable gain means.

2. A playback equalizer according to claim 1, wherein said adder is an analog adder.

3. A playback equalizer according to claim 1, wherein said variable gain means comprises a plurality of amplifiers having different gains from one another and switching means which determine which of said plurality of amplifiers provide an output to said adder in accordance with said control data.

4. A playback equalizer according to claim 1, wherein said control data comprises a plurality of control voltage having dissimilar voltage levels, and said variable gain means is a voltage controlled variable gain circuit whose gain is varied in response to said plurality of control voltages.

5. A playback equalizer according to claim 1, wherein said control data comprises a plurality of external resistors having different resistances, and said variable gain means is an electronic impedance device whose input impedance changes in response to said control data.

6. A playback equalizer according to claim 5, wherein said main path is provided with a first amplifier whose gain is set according to a ratio of semiconductor resistances in an integrated circuit.

7. A playback equalizer according to claim 6, wherein said low-pass filer includes a first capacitor outside of said integrated circuit, wherein a first external resistor is connected to said first capacitor outside of said integrated circuit, wherein a voltage-current converter is coupled to the output of said first amplifier in said integrated circuit to convert an output voltage from said first amplifier into an output signal current, and wherein said first capacitor and said first external resistor are driven by the output signal current of said voltage-current converter.

8. A playback equalizer for providing compensation for a playback signal from a magnetic tape playback head comprising:
   (a) a main path having a first end and a second end, said first end being supplied with said playback signal;
   (b) a side path having a first end and a second end, said first end being supplied with said playback signal;
   (c) a voltage-current converter having an input terminal coupled to said first end of said main path, said voltage-current converter being formed in an integrated circuit;
   (d) a low-pass filter disposed between the output terminal of said voltage-current converter and said second end of said main path, said low-pass filter including a parallel circuit of a first external capacitor and a first external resistor disposed outside said integrated circuit, said parallel circuit being driven by the output signal current of said voltage-current converter, said low-pass filter transmitting a signal which has a first component of flat frequency characteristic below a predetermined first frequency as well as a second component of decreasing frequency characteristic above said predetermined first frequency to said second end, said predetermined first frequency being established by setting the capacitance of said first external capacitor and the resistance of said first external resistor;
   (e) variable gain means disposed between said first end and said second end of said side path, said variable gain means having a substantially flat frequency characteristic over a predetermined frequency range and the gain of which is varied in response to control data; and
   (f) an adder coupled to said second ends of said main and side paths, said adder including mens for adding a signal at said second end of said main path and a signal at said second end of said side path and means for transmitting the added signal which has a first component of flat frequency characteristic below said predetermined first frequency, a second component of decreasing frequency characteristic between said predetermined first frequency and a predetermined second frequency and a third component of flat frequency characteristic above said predetermined second frequency to the output terminal, said predetermined second frequency being adjusted by said decreasing frequency characteristics of said low-pass filter and said gain of said variable gain means.

9. A playback equalizer according to claim 8, wherein said control data is comprised of a plurality of external resistors having different resistance, and said variable gain means is an electronic impedance device whose input impedance changes in response to said control data.

10. A playback equalizer for providing compensation for a playback signal from a magnetic tape playback head comprising:
   (a) a main path having a first end and a second end, said first end being supplied with said playback signal;
   (b) a side path having a first end and a second end, said first end being supplied with said playback signal;
   (c) a low-pass filter disposed between said first end and said second end of said main path, said low-pass filter transmitting a signal having a first component of flat frequency characteristic below a predetermined first frequency as well as a second component of decreasing frequency characteristic above said predetermined first frequency to said second end, said low-pass filter including an electronic impedance device formed in an integrated circuit and a first capacitor disposed outside said integrated circuit, the resistance of said electronic impedance device being changed in response to first control data, said predetermined first frequency being established by setting the capacitance of said first capacitor and said resistance of said electronic impedance device;
   (d) variable gain means disposed between said first end and said second end of said side path, said variable gain means having a substantially flat frequency characteristic over a predetermined frequency range and the gain which is varied in response to second control data; and
   (e) an adder coupled to said second ends of said main and side paths, said adder including means for adding a signal at said second end of said main path and a signal at said second end of said side path and means for transmitting the added signal which has a first component of flat frequency characteristic below said predetermined first frequency, a second component of decreasing frequency characteristic between said predetermined first frequency and a predetermined second frequency and a third component of flat frequency characteristic above said predetermined second frequency to the output terminal, said predetermined second frequency being adjusted by said decreasing frequency characteristic of said low-pass filter and said gain of said variable gain means.

\* \* \* \* \*